United States Patent
McCarthy et al.

(10) Patent No.: US 7,924,895 B2
(45) Date of Patent: Apr. 12, 2011

(54) MONOLITHIC DIODE-PUMPED LASER CAVITY

(75) Inventors: John C. McCarthy, Stratham, NH (US);
Randy C. Day, Weare, NH (US);
Robert J. Grasso, Boxford, MA (US);
York E. Young, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 23 days.

(21) Appl. No.: 11/805,304

(22) Filed: May 23, 2007

(65) Prior Publication Data

US 2008/0291948 A1    Nov. 27, 2008

(51) Int. Cl.
*H01S 3/04* (2006.01)

(52) U.S. Cl. ............................. 372/34; 372/36
(58) Field of Classification Search ............ 372/34, 372/36
See application file for complete search history.

(56) References Cited

U.S. PATENT DOCUMENTS

| | | | |
|---|---|---|---|
| 4,268,799 A | 5/1981 | McCrickerd | |
| 6,256,142 B1 | 7/2001 | Injeyan et al. | |
| 6,754,418 B1 * | 6/2004 | Holm et al. | 385/49 |
| 6,759,913 B2 | 7/2004 | Biernacki | |
| 2003/0002544 A1 * | 1/2003 | Peterson | 372/10 |
| 2005/0163184 A1 * | 7/2005 | Hilliard | 372/67 |
| 2006/0159132 A1 * | 7/2006 | Young et al. | 372/10 |
| 2006/0238864 A1 * | 10/2006 | Iida | 359/484 |
| 2007/0064747 A1 * | 3/2007 | Feve et al. | 372/10 |

FOREIGN PATENT DOCUMENTS

EP    1281219    3/2004

OTHER PUBLICATIONS

Langrock, et al.; Laser Diode CW Pumped Nd: YAG Laser; IEEE Journal on Selected Topics in Quantum Electronics, vol. XX, No. Y, Mar. 2002; pp. 101-103.

Nettleton, et al.; Micro-Laser Range Finder Development: Using the Monolithic Approach; http://www.repairfaq.org/sam/lr; pp. 1-21, Feb. 1999.

High-Reflection Coatings; web site: http://www.mellesgriot.com/pdf/catalogX/X_05_13-16.pdf, May 23, 2007.

Q-Switching; web site: http://en.wikipedia.org/wiki/Q-switching, May 21, 2007.

(Continued)

*Primary Examiner* — Tod T Van Roy (74) *Attorney, Agent, or Firm* — Finch & Maloney PLLC; Neil F. Maloney (57) ABSTRACT

A monolithic pumped laser cavity design is disclosed. Elements of the laser cavity, such as gain material, Q-switch, reflector, and outcoupler, are contact bonded together with a thermally conductive epoxy. The assembly is then operatively coupled to a heat sink (e.g., by mechanical or chemical means). The assembly is potted in thermally conductive potting material. The stacked elements or a subset thereof may be bonded to heat sink mounts and/or face cooling layers. In this fashion, various elements can be easily assembled and bonded together to provide the desired combination of laser energy, pulse width, and repetition frequency. The thermally conductive potting material provides structural integrity, as well as thermal management by extracting heat from the encased assembly to the heat sink. The optional heat sink mounts and face cooling operate to further extract heat and reduce thermal loading. Outcoupling to fiber may also be provided.

18 Claims, 3 Drawing Sheets

OTHER PUBLICATIONS

Extremely Thermally Conductive, Epoxy Potting Compound; web site: http://server.creativematerials.com/datasheets/DS_116_04A_B187.pdf, Sep. 20, 2006.

UV-Curing Epoxy; web site: http://www.newport.com/store/genproduct.aspx?id=139714&lang=1033&Section=Spec, May 21, 2007.

GSP 1345 Thermally Conductive 1:1 Potting Compound; web site: http://www.globalspec.com/FeaturedProducts/Detail/GSPolymers/GSP_1345_Thermally_Conductive_11_Potting_Compound/303, May 21, 2007.

Thermally Conductive Adhesives; web site: http://www.diemat.com, May 21, 2007.

* cited by examiner

MONOLITHIC DIODE-PUMPED LASER CAVITY

FIELD OF THE INVENTION

The invention relates to lasers, and more particularly, to a monolithic laser cavity design.

BACKGROUND OF THE INVENTION

As is known, a laser produces an intense, coherent, directional beam of light or radiation. A laser generally includes three main components: an energy 'pump' source, a gain medium, and a resonator cavity. The energy pump source generates a population inversion in the gain medium, and the gain medium amplifies light traveling therein. The resonator cavity typically includes a mirror disposed at each end of the gain medium, effectively defining the cavity. The pump source can be implemented, for example, with a laser diode array or flash-lamp, and the gain medium can be implemented as gas, liquid, or solid, as typically done.

During the lasing process, photons propagating along the axis of the cavity bounce back and forth across the active medium, thereby building intensity. The light in the cavity forms resonant standing waves having a frequency equal to $n(c/2D)$, where n is the standing wave pattern or mode (e.g., 1, 2, 3, etc), c is the speed of light, and D is the distance between the mirrors. These modes are sustained in the resonator cavity, and the generated light beam is generally limited to be within the corresponding range of frequencies.

In conventional monolithic pumped laser cavity designs, the various optical components (e.g., end caps, mirrors and passive Q-switch) are aligned to form the laser cavity, thereby forming a monolithic laser cavity. As recognized by the inventors, currently available solutions for monolithic pumped laser cavity designs are associated a number of problems and performance issues.

What is needed, therefore, are better monolithic pumped laser cavity designs.

SUMMARY OF THE INVENTION

One embodiment of the present invention provides a monolithic pumped laser cavity system. The system includes a gain medium for providing optical gain for lasing, and a reflector operatively coupled to one side of the gain medium, for forming one end of a laser resonator cavity. The system further includes a passive Q-switch operatively coupled to an opposite side of the gain medium for switching between high and low quality factors to facilitate lasing, and a laser outcoupler operatively coupled to the passive Q-switch, for forming another end of the laser resonator cavity. The system also includes a heat sink, wherein the gain medium, reflector, passive Q-switch, and laser outcoupler are encased in thermally conductive potting material for extracting heat from the laser resonator cavity to the heat sink. The system may further include a first end-cap operatively coupled between the gain medium and the laser high reflector, and a second end-cap operatively coupled between the gain medium and the passive Q-switch. Each of the end-caps is also encased in the thermally conductive potting material, and an aspect ratio of end-cap to gain medium cross-section is varied to generate desired thermal gradients in the gain medium. A first face of at least one of the gain medium, reflector, passive Q-switch, and laser outcoupler may be bonded to a thermally conductive heat sink mount that provides an area for a clear aperture and face cooling, the mount being operatively coupled to the heat sink. Alternatively, or in addition to, a second face of at least one of the gain medium, reflector, passive Q-switch, and laser outcoupler may include a layer of heat conducting material that provides an area for a clear aperture and face cooling. Each layer of heat conducting material may include, for example, indium or gold. The thermally conductive potting material may also be used to bond the at least one of the gain medium, reflector, passive Q-switch, and laser outcoupler to their respective thermally conductive heat sink mounts or face cooling layers. The system may include a fiber interface for coupling laser output of the system directly into a fiber. The thermally conductive potting material can also be used to hard mount the system to a chassis.

Another embodiment of the present invention provides a method for manufacturing a monolithic diode-pumped laser cavity. The method includes providing a gain medium, the gain medium for providing optical gain for lasing. The method continues with operatively coupling a reflector to one side of the gain medium, the reflector for forming one end of a laser resonator cavity. The method continues with operatively coupling a passive Q-switch to an opposite side of the gain medium, the passive Q-switch for switching between high and low quality factors to facilitate lasing. The method continues with operatively coupling a laser outcoupler to the passive Q-switch, the laser outcoupler for forming another end of the laser resonator cavity. The method continues with encasing the gain medium, reflector, passive Q-switch, and laser outcoupler in thermally conductive potting material for extracting heat from the laser resonator cavity to a heat sink. The method may further include operatively coupling a first end-cap between the gain medium and the laser high reflector, and operatively coupling a second end-cap between the gain medium and the passive Q-switch, and varying an aspect ratio of end-cap to gain medium cross-section to generate desired thermal gradients in the gain medium. Each of the end-caps is also encased in the thermally conductive potting material. The method may include bonding a face of at least one of the gain medium, reflector, passive Q-switch, and laser outcoupler to a thermally conductive heat sink mount that provides an area for a clear aperture and face cooling, and operatively coupling the mount to the heat sink. Alternatively, or in addition to, the method may include applying a face cooling layer to at least one of the gain medium, reflector, passive Q-switch, and laser outcoupler that provides an area for a clear aperture, wherein the one or more face cooling layers comprises indium or gold. The method may include hard mounting the monolithic diode-pumped laser cavity to a chassis with the thermally conductive potting material.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

Note that the various features shown in FIGS. 1a through 1c are not drawn to any particular scale. Rather, the figures are drawn to emphasize features and structure for purposes of explanation. The actual geometries and scale of the pertinent features and structure will be apparent in light of this disclosure.

DETAILED DESCRIPTION OF THE INVENTION

As previously indicated, the inventors have identified a number of problems and performance issues associated with currently available solutions for monolithic pumped laser cavity designs. In more detail, current solutions include diffusion bonding or optically contacting end caps, laser mirrors and passive Q-switch together to form a monolithic structure. Another conventional technique is where the passive Q-switch material is deposited directly onto the gain material. Such conventional techniques typically are costly and involve specialized processing. The reliability of the resulting assemblies is poor, particularly in severe environmental conditions. In addition, such techniques are prone to thermal loading of gain medium.

Embodiments of the present invention provide monolithic pumped laser cavity designs, as well as techniques for contacting dissimilar optical materials that make up the design. Edge cooling and/or face cooling are employed to provide improved thermal management compared to conventional techniques. In addition, the resulting laser cavity designs are stable over wide operating temperature ranges, including severe environmental conditions.

In accordance with one embodiment, an active laser gain material is bonded to a thin thermally conductive heat sink mount that allows heat to be removed from the bonded face and provides a central unbonded area for a clear aperture of the lasing mode volume. The other side of this gain sheet protrudes from the heat sink mount and includes a thin layer of heat conducting material (e.g., indium or gold foil) to provide face cooling, also having a central aperture of minimal size (depending on the application). This gain material subassembly is then contact bonded with other similarly constructed subassemblies that include elements used for passive Q-switching, laser resonator construction, thermal compensation and transverse or longitudinal mode selection. Each of these other elements is bonded to its own heat sink mount and face cooling layer in a similar fashion as the gain material element. The subassemblies (e.g., gain material, Q-switch, reflector, and outcoupler) are then stacked together in a sandwich fashion. In one such case, this stacked assembly is formed by coupling each heat sink mount onto the heat sink element configured to receive each of the mounts. The entire assembly is then potted with thermally conductive epoxy to further facilitate efficient heat removal (the heat sink does not need to be included in the potting). In this fashion, various elements can be easily assembled and bonded together to provide the desired combination of laser energy, pulse width, and repetition frequency. In other embodiments, only a subset of the stacked elements are bonded to heat sink mounts and face cooling layers, with other elements included in the stack being bonded directly to one another. In other embodiments, the stack is bonded directly to a heat sink (i.e., no heat sink mounts are required). In such a case, some or all of the elements may have face cooling layers to further reduce thermal loading of gain medium and other elements. Other embodiments include a stack of elements bonded directly to one another, and the stack is then bonded directly to a heat sink (i.e., no heat sink mounts or face cooling layers are required). Another embodiment provides a fiber coupled version of such laser structures, where the final output portion of the laser resonator cavity includes optical assemblies to launch the laser output of the monolithic pumped design directly into a fiber for applications such as laser seeding and/or amplifier applications.

In any such embodiments, the thermally conductive potting compound provides structural integrity, as well as thermal management by extracting heat from the encased laser structure to the heat sink. The optional heat sink mounts and face cooling each operate to further extract heat and reduce thermal loading of the various elements. The aspect ratio of the laser structure can be varied to generate desired thermal gradients in the gain medium (sometimes referred to as laser medium).

The resulting monolithic pumped laser cavity design produces high peak powers in a compact robust package and can be used, for example, in eye-safe LADAR/LIDAR transmitter applications, although other applications will be apparent in light of this disclosure (such as those applications having wavelengths from the UV to the Mid Infrared, if appropriate). The monolithic pumped laser cavity design is also capable to providing various combinations of laser operating pulse repetition rate, pulse energy and laser pulse width.

System Architecture

Figure 1A:
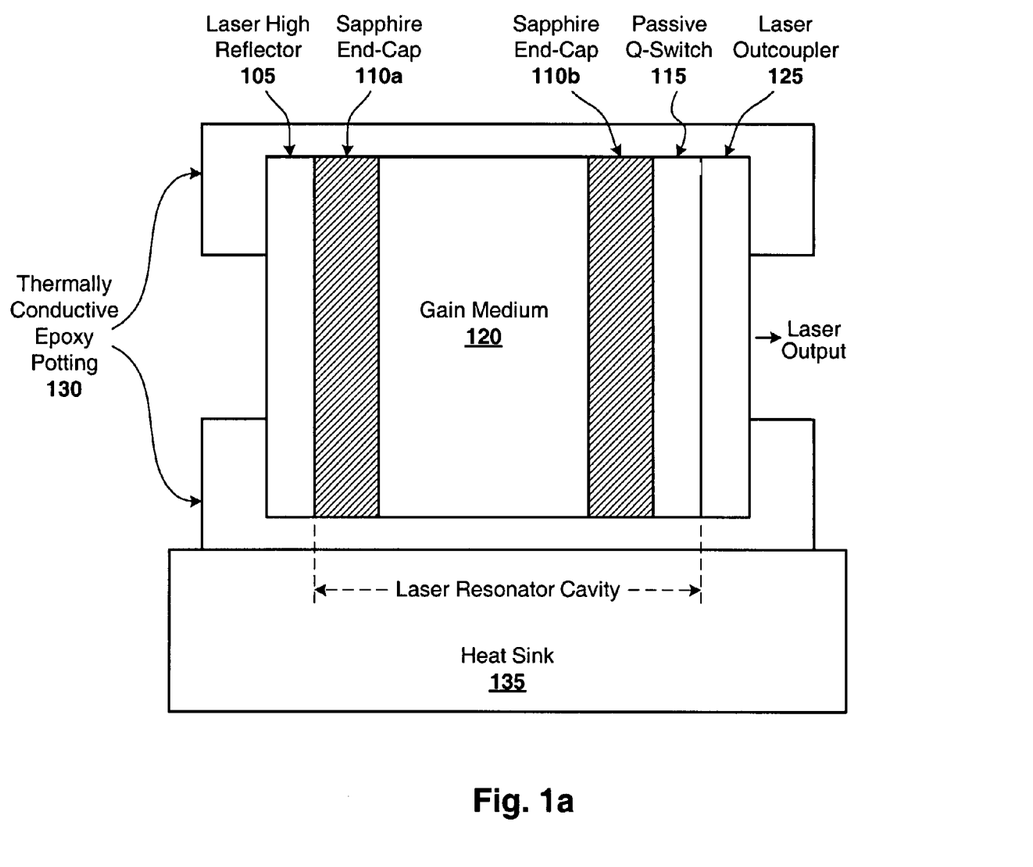
FIG. 1a illustrates a monolithic pumped laser cavity system configured in accordance with one embodiment of the present invention.

FIG. 1a illustrates a monolithic pumped laser cavity system configured in accordance with one embodiment of the present invention. As can be seen, the system includes a laser high reflector 105, two optional sapphire end-caps 110a and 110b, a passive Q-switch 115, a gain medium 120, and a laser outcoupler 125 all encased in conductive epoxy potting 130. The potted assembly is operatively coupled with a heat sink 135. This embodiment utilizes a thermally conductive epoxy potting 130 in conjunction with the heat sink 135 to provide both thermal management and structural integrity. Such a design can be further improved by employing heat sink mounts and/or face cooling, as will be discussed with reference to FIG. 1b.

The laser high reflector 105 forms one end of the laser resonator cavity, with the other end formed by the laser outcoupler 125. In one particular embodiment, the laser high reflector 105 is a laser mirror with a dielectric coating to provide High Reflection (HR) at the laser wavelength and high transmission at the pump wavelength. The side of the laser high reflector 105 facing the gain medium 120 is coated with the HR dielectric coating, and the other side is coated for Anti Reflection (AR) at the lasing wavelength and high transmission at the pumping wavelength.

The laser outcoupler 125 is a laser mirror that forms the other end of the laser resonator cavity, as noted above. In one particular embodiment, the side of the laser outcoupler 125 facing the gain medium 120 is coated with a dielectric coating that is Partially Reflective (PR) at the lasing wavelength. The other side is Anti Reflection (AR) coated at lasing wavelength. A number of HR/PR/AR schemes will be apparent in light of this disclosure and any number of conventional dielectric and dielectric-enhanced metallic coatings can be used.

As previously explained, the gain medium 120 is a material that provides the requisite optical gain for lasing. The gain medium 120 can be implemented as conventionally done. In one particular example embodiment, the gain medium 120 is implemented with a crystalline laser host doped with lasing ion. Specific examples of such gain medium 120 include certain crystals (e.g., sapphire—$Al_2O_3$, yttrium aluminum garnet—YAG, yttrium orthovanadate—$YVO_4$) and ceramic hosts, doped with transition metal ions (e.g., titanium or chromium ions) or rare-earth ions (e.g., ions of ytterbium—Yb, neodymium—Nd, or erbium—Er). In alternative embodiments, gain medium 120 can be implemented with semiconductors (e.g., gallium arsenide—GaAs, gallium nitride—GaN, indium gallium arsenide—InGaAs). In alternative embodiments, gain medium 120 can be implemented with glasses (e.g., silicate or phosphate glasses) similarly doped with lasing ions as with a crystalline laser host. Various other suitable gain mediums 120 will be apparent in light of this disclosure. Note that the gain medium 120 appears thicker than other elements shown in the figures for purposes of illustration, but in actuality can be as thin as the other elements, depending on the particular application, and as will be apparent in light of this disclosure.

The end-caps 110a and 110b are in contact with end of gain medium 120 and operate to extract heat out of the gain medium 120 to the thermally conductive epoxy potting 130. These end-caps further contribute to structural integrity and heat extraction and are optional. In this example embodiment, the end-cap 110a is in contact with the gain medium 120 on one side and the laser high reflector 105 on the other side. The end-cap 110b is in contact with the gain medium 120 on one side and the passive Q-switch 115 on the other side. In the embodiment shown in FIG. 1a, the end-caps 110a and 110b are both implemented with sapphire—$Al_2O_3$. Other embodiments will be apparent in light of this disclosure, and the present invention is not intended to be limited to sapphire end-caps. Heat extracting end-cap materials can vary depending on factors such as the make-up and type of gain medium 120 as well as laser power.

The passive Q-switch 115 provides switching between high and low quality factors (Q-factors), which is generally achieved by placing a variable attenuator inside the optical resonator cavity of the laser. When the attenuator is 'on' (low Q-factor), light that exits the gain medium 120 is effectively lost or otherwise attenuated, and lasing cannot begin. On the other hand, when the attenuator is 'off' (high Q-factor), there is low resonator attenuation.

In operation, the gain medium 120 is pumped while the Q-switch 115 is configured to prevent feedback of light into the gain medium 120 (low Q-factor). This action causes a population inversion, but lasing does yet commence because there is no feedback from the resonator cavity (due to the attenuation affect of the Q-switch 115). As is known, the stimulated emission rate depends on the amount of light entering the gain medium 120. The amount of energy stored in the gain medium 120 therefore increases as the medium 120 is pumped. As a result, the gain medium 120 eventually provides sufficient photon flux to saturate the Passive Q-switch 115, resulting in a high Q oscillator condition to initiate the lasing process.

Upon passive Q-switch saturation, the oscillator switches from low to high Q-factor, thereby allowing feedback from the resonator cavity and the process of optical amplification by stimulated emission commences. Given the substantial energy stored in the gain medium 120, the intensity of light in the laser resonator cavity rapidly increases (simultaneously causing energy stored in the medium 120 to deplete). The output caused by this exchange is a pulse of laser light. The peak intensity of the laser light generated by this process can vary, depending on the laser configuration and the desired lasing performance, as is known.

In one particular embodiment, the Q-switch 115 is implemented as a passive $Cr^{4+}$ Q-switch (YAG or other tetravalent chromium) having a crystalline saturable absorber that acts as an optical switch to produce a single 10 to 30 nanosecond Q-switched laser pulse. As previously explained, each of the laser high reflector 105, end-caps 110a and 110b, passive Q-switch 115, and laser outcoupler 125 are contact bonded in place to provide a sandwich structure as shown in FIG. 1a. In the embodiment shown, the aspect ratio of the end-cap 110a or 110b to gain medium 120 cross-sections can be varied to generate desired thermal gradients in gain medium 120.

The conductive epoxy potting 130 is a potting compound that can be used to both bond the individual elements together as well as encase the laser structure so as to conduct heat to the heat sink 135. The heat sink 135 forms part of the resonator cavity and provides a path for conduction cooling. The heat sink 135 can be implemented with aluminum, copper, or other suitable heat sink material, and may also be shaped or otherwise configured to suit the particular application at hand (e.g., a planer surface upon which the laser structure is bonded, or a box in which the laser structure sits and having an aperture). As previously explained, and in accordance with one embodiment, optical surfaces of components making up the cavity are contact bonded using thermally conductive epoxy (e.g., NuSil Technology's CV-2946, or similar thermally conductive epoxies or adhesives from Diemat, Inc. or Indium Corporation), leaving a minimally sized central aperture for laser operation.

Thus, the entire laser structure (and at least a surface of the heat sink 135) are completely potted in the conductive epoxy potting 130. The conductive epoxy potting 130 also holds the monolithic structure together, and can also be used to hard mount the laser to a chassis.

Figure 1B:
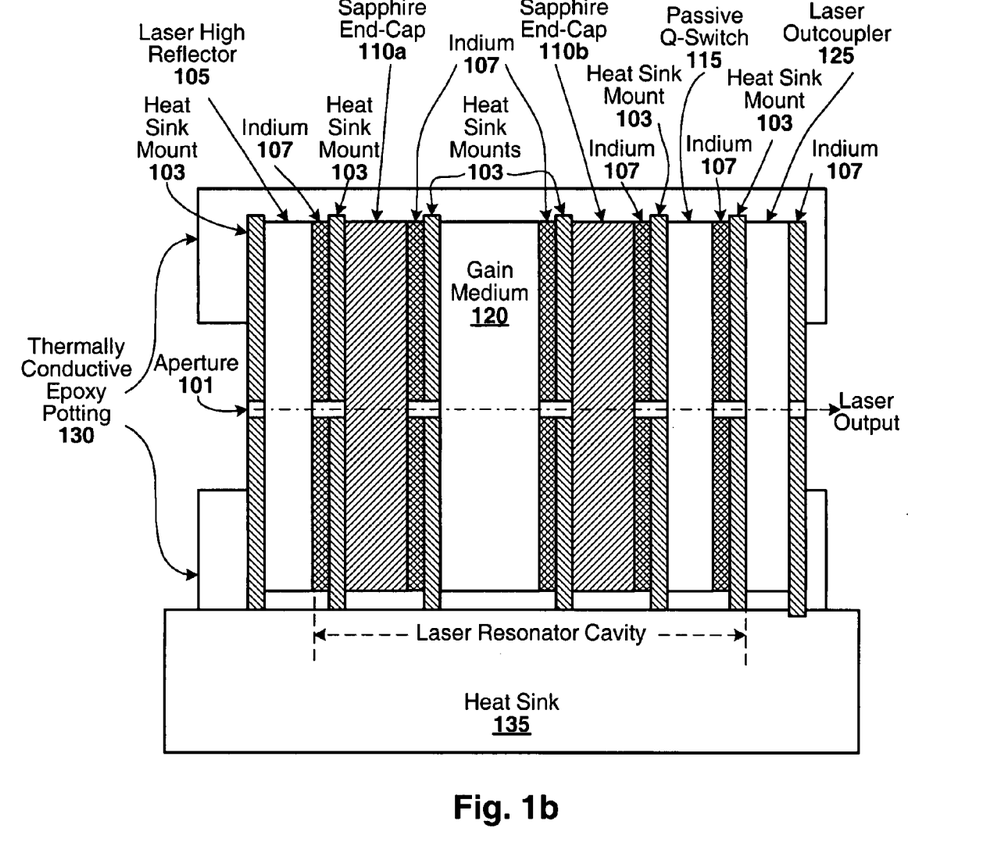
FIG. 1b illustrates a monolithic pumped laser cavity system configured in accordance with another embodiment of the present invention.

FIG. 1b illustrates a monolithic pumped laser cavity system configured in accordance with another embodiment of the present invention. This embodiment is similar to the embodiment discussed with reference to FIG. 1a, and discussion for the common components equally applies here.

As can be seen, the active laser gain medium 120 is bonded to a thin thermally conductive heat sink mount 103 that allows heat to be removed from the bonded face of the element and provides a central unbonded area for a clear aperture 101 of the lasing mode volume. The mounts 103 can be made, for example, for from the same material as the heat sink 135 (e.g., aluminum or copper). The other side of this gain medium 120 protrudes from the heat sink mount 103 and includes a thin layer of indium 107 or other suitable heat conducting material (e.g., gold foil) to provide face cooling, also having a central aperture 101 of minimal size (depending on the application). This gain medium subassembly is then contact bonded with other similarly constructed subassemblies, including optional sapphire end-cap 110a, laser high reflector 105, sapphire end-cap 110b, passive Q-switch 115, and laser outcoupler 125.

As shown, each of the elements is contact bonded to its own heat sink mount 103 and has a face cooling layer of indium 107. Each of the mounts 103 and layers 107 includes an aperture 101. The subassemblies (e.g., gain medium 120, Q-switch 115, reflector 105, end-caps 110a and 110b, and outcoupler 125) are then stacked together in a sandwich fashion. Once assembled, the stacked elements operate to provide passive Q-switching, laser resonator construction, thermal compensation and transverse or longitudinal mode selection. As is known, transverse mode refers to the cross-sectional size of the laser beam which is determined by the size of the pump beam, and longitudinal mode refers to the number of standing waves supported by the laser cavity length. In one such case, this stacked assembly is formed by operatively coupling (e.g., with mechanically fasteners, solder, conductive epoxy bond, or a snap or otherwise machined fitting scheme) each heat sink mount 103 onto the heat sink 135.

The entire assembly is then potted with thermally conductive epoxy 130 to further facilitate efficient heat removal. The heat sink 135 may be partially included in the potting 130. The various elements of the overall laser structure can be readily assembled and bonded together to provide the desired combination of laser energy, pulse width, and repetition frequency.

In other embodiments, only a subset of the stacked elements are bonded to heat sink mounts 103 and face cooling layers 107, with other elements included in the stack being bonded directly to one another (e.g., using potting 130 or other suitable thermally conductive adhesive). In other embodiments, the stack is bonded directly to a heat sink 135 (i.e., no heat sink mounts 103 are required). In such a case, some or all of the elements may have face cooling layers 107 to further reduce thermal loading of gain medium 120 and other elements.

Figure 1C:
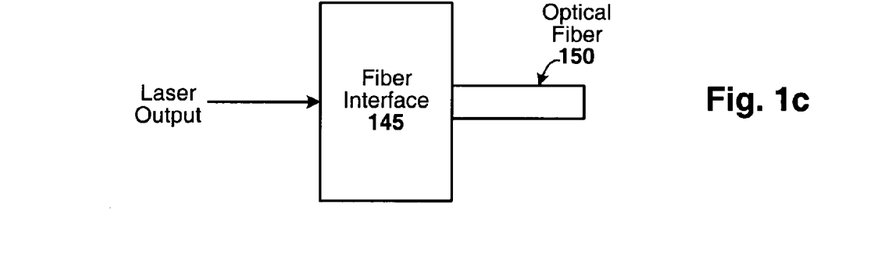
FIG. 1c illustrates a fiber interface for coupling laser output of a monolithic pumped laser cavity system directly into a fiber, configured in accordance with another embodiment of the present invention.

As previously explained and as shown in FIG. 1c, the laser outcoupler 125 may include or otherwise be operatively coupled with a fiber interface 145 that includes optical componentry (e.g., laser mirrors or guide) for launching the laser output of the monolithic pumped design directly into a fiber 150 for applications such as laser seeding and/or amplifier applications. Potting the entire assembly in potting 103, in conjunction with mounts 103 and layers 107, has the advantage of allowing for both edge cooling and face cooling to provide an overall efficient thermal management scheme.

Manufacturing Method

Figure 2:
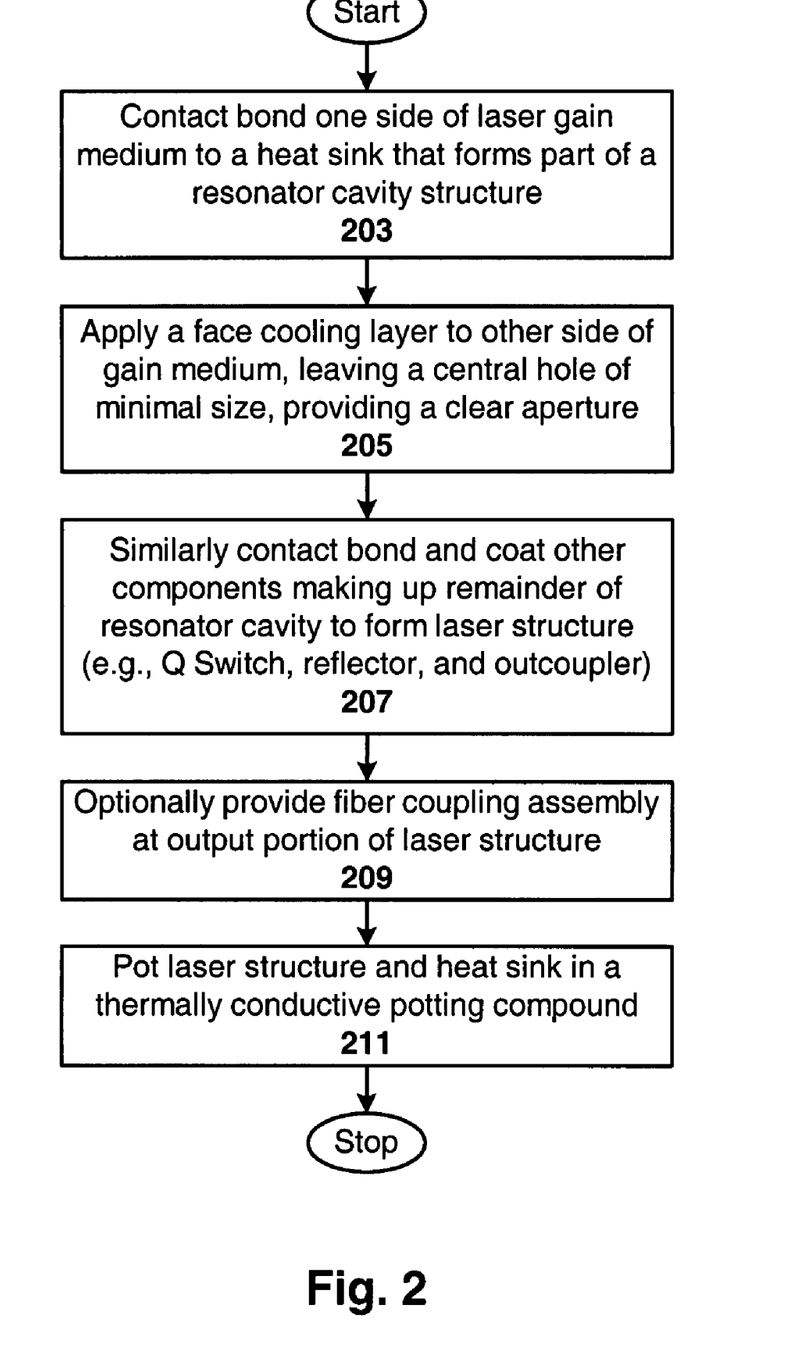
FIG. 2 illustrates a method for manufacturing a monolithic diode-pumped laser cavity configured in accordance with an embodiment of the present invention.

FIG. 2 illustrates a method for manufacturing a monolithic diode-pumped laser cavity configured in accordance with an embodiment of the present invention.

The method begins with contact bonding 203 one side of a laser gain medium to a heat sink that forms part of a resonator cavity structure (e.g., using a thermally conductive epoxy), and applying 205 a face cooling layer to the other side of laser gain medium, leaving a central hole of minimal size appropriate for the intended lasing application, thereby providing a clear aperture. The face cooling layer can be, for example, indium, gold foil, or other suitable face cooling layer, and can be bonded (e.g., using a thermally conductive epoxy), coated (e.g., using brushing, spraying, or sputtering), or otherwise applied to the target element face.

The method continues with contact bonding 207 other components making up the remainder of the resonator cavity (e.g., using a thermally conductive epoxy), thereby forming a laser structure including the gain medium, a passive Q-switch, optional end-caps, laser high reflector, laser outcoupler and HR/PR/AR coatings as previously explained. In one example embodiment, the gain medium is a crystalline laser host doped with lasing ion (e.g., sapphire—Al2O3, yttrium aluminum garnet—YAG, yttrium orthovanadate—YVO$_4$). The end-caps can be implemented with a suitable corresponding material (e.g., sapphire, etc). Recall that the aspect ratio of the end-cap to gain medium cross-section can be varied to generate desired thermal gradients in the gain medium, depending on the particular application.

The method may continue with optionally providing 209 a fiber coupling assembly at output portion of laser structure. Such an assembly can be used to launch the laser output of the device directly into a fiber for applications such as laser seeding and/or amplifier applications, if so desired.

The method continues with potting 211 the laser structure and at least a portion of the heat sink in a thermally conductive potting compound that provides both thermal management and structural integrity. The thermally conductive potting compound can be, for example, the same as the thermally conductive epoxy used in the contact bonding 303 and 207 (e.g., NuSil Technology's CV-2946, or similar thermally conductive epoxies or adhesives from Diemat, Inc. or Indium Corporation). The potting 211 process may further include operatively coupling the laser structure and heat sink assembly to a chassis or the like, thereby facilitating integration of the monolithic diode-pumped laser cavity into a given application.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A monolithic pumped laser cavity system configured with both edge and face cooling, comprising:
   a gain medium for providing optical gain for lasing;
   a laser high reflector operatively coupled to one side of the gain medium, for forming one end of a laser resonator cavity;
   a passive Q-switch operatively coupled to an opposite side of the gain medium for switching between high and low quality factors to facilitate lasing;
   a laser outcoupler operatively coupled to the passive Q-switch, for forming another end of the laser resonator cavity;
   a first end-cap operatively coupled between the gain medium and the laser high reflector; and
   a second end-cap operatively coupled between the gain medium and the passive Q-switch; and
   a heat sink, wherein the gain medium, laser high reflector, passive Q-switch, first and second end-caps, and laser outcoupler are encased in thermally conductive potting material, such that at least top and bottom edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to the heat sink, and an aspect ratio of end-cap to gain medium cross-section is varied to generate desired thermal gradients in the gain medium.

2. The system of claim 1 wherein a face of at least one of the gain medium, laser high reflector, passive Q-switch, and laser outcoupler includes a layer of heat conducting material that provides an area for a clear aperture and face cooling.

3. The system of claim 2 wherein each layer of heat conducting material comprises indium or gold.

4. The system of claim 1 further comprising a fiber interface for coupling laser output of the system directly into a fiber.

5. A monolithic pumped laser cavity system configured with both edge and face cooling, comprising:
   a gain medium for providing optical gain for lasing;
   a laser high reflector operatively coupled to one side of the gain medium, for forming one end of a laser resonator cavity;

a passive Q-switch operatively coupled to an opposite side of the gain medium for switching between high and low quality factors to facilitate lasing;

a laser outcoupler operatively coupled to the passive Q-switch, for forming another end of the laser resonator cavity; and a heat sink, wherein the gain medium, laser high reflector, passive Q-switch, and laser outcoupler are encased in thermally conductive potting material, such that at least top and bottom edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to the heat sink, wherein a face of at least one of the gain medium, laser high reflector, passive Q-switch, and laser outcoupler is bonded to a thermally conductive heat sink mount that provides an area for a clear aperture and face cooling, the mount being operatively coupled to the heat sink.

6. A monolithic pumped laser cavity system configured with both edge and face cooling, comprising:

a gain medium for providing optical gain for lasing;

a laser high reflector operatively coupled to one side of the gain medium, for forming one end of a laser resonator cavity;

a passive Q-switch operatively coupled to an opposite side of the gain medium for switching between high and low quality factors to facilitate lasing;

a laser outcoupler operatively coupled to the passive Q-switch, for forming another end of the laser resonator cavity; and a heat sink, wherein the gain medium, laser high reflector, passive Q-switch, and laser outcoupler are encased in thermally conductive potting material, such that at least top and bottom edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to the heat sink;

wherein:
a first face of at least one of the gain medium, laser high reflector, passive Q-switch, and laser outcoupler is bonded to a thermally conductive heat sink mount that provides an area for a clear aperture and face cooling, each mount being operatively coupled to the heat sink; and a second face of at least one of the gain medium, laser high reflector, passive Q-switch, and laser outcoupler includes a layer of heat conducting material that provides an area for a clear aperture and face cooling.

7. The system of claim 6 wherein the thermally conductive potting material is also used to bond the at least one of the gain medium, laser high reflector, passive Q-switch, and laser outcoupler to at least one of their respective face cooling layers and thermally conductive heat sink mounts.

8. The system of claim 6 wherein:
the first face of each of the gain medium, laser high reflector, passive Q-switch, and laser outcoupler is bonded to a thermally conductive heat sink mount that provides an area for a clear aperture and face cooling, each mount being operatively coupled to the heat sink; and
the second face of each of the gain medium, laser high reflector, passive Q-switch, and laser outcoupler includes a layer of heat conducting material that provides an area for a clear aperture and face cooling.

9. A monolithic pumped laser cavity system configured with both edge and face cooling, comprising:

a gain medium for providing optical gain for lasing;

a laser high reflector operatively coupled to one side of the gain medium, for forming one end of a laser resonator cavity;

a passive Q-switch operatively coupled to an opposite side of the gain medium for switching between high and low quality factors to facilitate lasing;

a laser outcoupler operatively coupled to the passive Q-switch, for forming another end of the laser resonator cavity; and a heat sink, wherein the gain medium, laser high reflector, passive Q-switch, and laser outcoupler are encased in thermally conductive potting material, such that at least top and bottom edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to the heat sink, wherein the thermally conductive potting material also hard mounts the system to a chassis.

10. A monolithic pumped laser cavity system configured with both edge and face cooling, comprising:

a gain medium for providing optical gain for lasing;

a laser high reflector operatively coupled to one side of the gain medium, for forming one end of a laser resonator cavity;

a first end-cap operatively coupled between the gain medium and the laser high reflector;

a passive Q-switch operatively coupled to an opposite side of the gain medium for switching between high and low quality factors to facilitate lasing;

a second end-cap operatively coupled between the gain medium and the passive Q-switch;

a laser outcoupler operatively coupled to the passive Q-switch, for forming another end of the laser resonator cavity; and a heat sink, wherein the gain medium, laser high reflector, passive Q-switch, first and second end-caps, and laser outcoupler are encased in thermally conductive potting material, such that at least top, bottom, and side edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to the heat sink;

wherein the at least one face is bonded to a thermally conductive heat sink mount that provides an area for a clear aperture and face cooling, the mount being operatively coupled to the heat sink.

11. The system of claim 10 wherein an aspect ratio of end-cap to gain medium cross-section is varied to generate desired thermal gradients in gain medium.

12. The system of claim 10 wherein a second face of at least one of the gain medium, laser high reflector, passive Q-switch, and laser outcoupler includes a layer of heat conducting material that provides an area for a clear aperture and face cooling.

13. The system of claim 10 further comprising a fiber interface for coupling laser output of the monolithic pumped design directly into a fiber.

14. A method for manufacturing a monolithic diode-pumped laser cavity configured with both edge and face cooling, the method comprising:
   providing a gain medium, the gain medium for providing optical gain for lasing;
   operatively coupling a laser high reflector to one side of the gain medium, the laser high reflector for forming one end of a laser resonator cavity;
   operatively coupling a passive Q-switch to an opposite side of the gain medium, the passive Q-switch for switching between high and low quality factors to facilitate lasing;
   operatively coupling a laser outcoupler to the passive Q-switch, the laser outcoupler for forming another end of the laser resonator cavity;
   bonding a face of at least one of the gain medium, laser high reflector, passive Q-switch, and laser outcoupler to a thermally conductive heat sink mount that provides an area for a clear aperture and face cooling;
   encasing the gain medium, laser high reflector, passive Q-switch, and laser outcoupler in thermally conductive potting material, such that at least top and bottom edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to a heat sink; and
   operatively coupling the mount to the heat sink.

15. The method of claim 14 further comprising:
   operatively coupling a first end-cap between the gain medium and the laser high reflector;
   operatively coupling a second end-cap between the gain medium and the passive Q-switch; and
   varying an aspect ratio of end-cap to gain medium cross-section to generate desired thermal gradients in the gain medium;
   wherein each of the end-caps is also encased in the thermally conductive potting material.

16. The method of claim 14 further comprising:
   applying a face cooling layer to at least one of the gain medium, laser high reflector, passive Q-switch, and laser outcoupler that provides an area for a clear aperture; and
   wherein the one or more face cooling layers comprises indium or gold.

17. The method of claim 14 further comprising:
   applying a face cooling layer to a second face of at least one of the gain medium, laser high reflector, passive Q-switch, and laser outcoupler that provides an area for a clear aperture.

18. A method for manufacturing a monolithic diode-pumped laser cavity configured with both edge and face cooling, the method comprising:
   providing a gain medium, the gain medium for providing optical gain for lasing;
   operatively coupling a laser high reflector to one side of the gain medium, the laser high reflector for forming one end of a laser resonator cavity;
   operatively coupling a passive Q-switch to an opposite side of the gain medium, the passive Q-switch for switching between high and low quality factors to facilitate lasing;
   operatively coupling a laser outcoupler to the passive Q-switch, the laser outcoupler for forming another end of the laser resonator cavity;
   encasing the gain medium, laser high reflector, passive Q-switch, and laser outcoupler in thermally conductive potting material, such that at least top and bottom edges of the laser resonator cavity are covered by the thermally conductive potting material to provide edge cooling, and a face of at least one of the gain medium, laser high reflector, passive Q-switch, and laser outcoupler has face cooling, the edge and face cooling for extracting heat from the edges and the at least one face of the laser resonator cavity to a heat sink; and
   hard mounting the monolithic diode-pumped laser cavity to a chassis with the thermally conductive potting material.

* * * * *